United States Patent
Kenefic

(12) 
(10) Patent No.: US 9,030,352 B2
(45) Date of Patent: May 12, 2015

(54) SENSOR ROTATION BIAS REMOVAL

(75) Inventor: Richard J. Kenefic, Fort Wayne, IN (US)

(73) Assignee: Raytheon Company, Waltham, MA (US)

(*) Notice: Subject to any disclaimer, the term of this patent is extended or adjusted under 35 U.S.C. 154(b) by 582 days.

(21) Appl. No.: 13/313,295

(22) Filed: Dec. 7, 2011

(65) Prior Publication Data

US 2013/0147665 A1 Jun. 13, 2013

(51) Int. Cl.
*G01S 7/40* (2006.01)
*G01S 3/78* (2006.01)
G01S 3/784 (2006.01)
G01S 3/786 (2006.01)

(52) U.S. Cl.
CPC ............. *G01S 3/7803* (2013.01); *G01S 3/784* (2013.01); *G01S 7/40* (2013.01); *G01S 3/7864* (2013.01)

(58) Field of Classification Search
CPC ......... G01S 7/40; G01S 3/7803; G01S 3/785; G01S 3/7864; G01S 3/786
USPC ....................................... 342/173
See application file for complete search history.

(56) References Cited

U.S. PATENT DOCUMENTS 3,795,911 A * 3/1974 Hammack ................. 342/106
5,296,861 A    3/1994 Knight
5,394,233 A * 2/1995 Wang ........................ 356/5.01
5,854,601 A   12/1998 Kenefic
7,218,273 B1 * 5/2007 Webster et al. ............. 342/174
7,813,851 B2 * 10/2010 DeMersseman et al. .... 701/30.5
2006/0169021 A1   8/2006 Silverstein
2009/0254294 A1  10/2009 Dutta
2010/0106539 A1   4/2010 Kenefic
2010/0264216 A1  10/2010 Kenefic
2012/0105585 A1 * 5/2012 Masalkar et al. ........... 348/46

OTHER PUBLICATIONS

Moore, J. R et al.; Practical Aspects of Multisensor Tracking; Multitarget-Multisensor Tracking: Applications and Advances; vol. III; Yaakov Bar-Shalom and William Dale Blair (eds.); Artech House; Boston; 2000; pp. 47-53.
Lin, Xiangdong et al.; Exact Multisensor Dynamic Bias Estimation with Local Tracks; IEEE Transactions on Aerospace and Electronic Systems; vol. 40; No. 2; 2004; pp. 576-590.
Burns, Paul D. et al.; Sensor Bias Estimation from Measurements of Known Trajectories; Proceedings of the Thirty-Seventh Southeastern Symposium on System Theory; Mar. 20-22, 2005; pp. 373-377.
Quan, Long et al.; Linear N-Point Camera Pose Determination; IEEE Transactions on Pattern Analysis and Machine Intelligence; vol. 21; No. 8; Aug. 1999; pp. 774-780.

(Continued)

*Primary Examiner* — Matthew M Barker
(74) *Attorney, Agent, or Firm* — Burns & Levinson LLP; Joseph M. Maraia

(57) ABSTRACT

A method for determining rotation bias in a sensor using a cooperative target that includes receiving, via a processor, sensor data acquired in a field of view of a sensor at a plurality of points in time. The method also includes receiving, via the processor, position data for a cooperative target travelling along a path through the field of view of the sensor at the plurality of points in time. The method also includes determining, via the processor, a rotation bias in the sensor based on a maximum likelihood estimate performed over the path based on the sensor data and the cooperative target position data.

21 Claims, 3 Drawing Sheets

(56) References Cited

OTHER PUBLICATIONS

Davies, E. R.; Machine Vision: Theory, Algorithms, Practicalities; 3rd Edition; Elsevier; 2005; pp. 595-623.

Radke, Richard J. et al.; Image Change Detection Algorithms: A Systematic Survey; IEEE Transactions on Image Processing; vol. 14; No. 3; Mar. 2005; pp. 294-307.

Celenk, Mehmet et al.; Change Detection and Object Tracking in IR Surveillance Video; Third International Symposium on Signal-Image Technologies and Internet Based Systems; 2008; pp. 791-797.

Lanzkron, Paul et al.; Solid State X-Band Airport Surface Surveillance Radar; IEEE Conference on Radar; 2007; pp. 670-676.

Elkaim, G. H. et al.; Comparison of Low-Cost Sensors for Autonomous Vehicle Applications; ION/IEEE Plans; Monterey CA; Sep. 3, 2008; pp. 1133-1144.

Wikipedia web page, "Rotation Matrix", http://en.wikipedia.org/wiki/Rotation_matrix#Rotation_matrix_from_axis_and_angle, last modified Nov. 25, 2011; 27 pages.

Singer, Robert A.; Estimating Optimal Tracking Filter Performance for Manned Maneuvering Targets; IEEE Transactions on Aerospace and Electronic Systems; vol. 6; No. 4; 1970, pp. 473-483.

Bar-Shalom, Yaakov et al.; Tracking and Data Association; Academic Press; 1988; pp. 163-170.

Kennedy, J. et al; Particle Swarm Optimization; Proceedings of the IEEE International Conference on Neural Networks; Dec. 1995; pp. 1942-1948.

Parsopoulos, K.E. et al.; Unified Particle Swarm Optimization for Tackling Operations Research Problems; IEEE 2005 Swarm Intelligence Symposium; Pasadena CA; pp. 53-59.

Lane, James et al.; Particle Swarm Optimization with Spatially Meaningful Neighbours; 2008 Swarm Intelligence Symposium; St. Loius, MO; Sep. 21-23, 2008; pp. 1-8.

Noel, Mathew Mithra et al.; Simulation of a New Hybrid Particle Swarm Optimization Algorithm; Proceedings of the Thirty-Sixth Southeast Symposium on System Theory; Atlanta, GA; Mar. 14-16, 2004; pp. 150-153.

\* cited by examiner

US 9,030,352 B2

SENSOR ROTATION BIAS REMOVAL

BACKGROUND

In many security applications, fixed cameras, pan-tilt-zoom (PTZ) cameras, and short range surface detection radars are mounted on towers to provide complete coverage of the secured area. These towers are prone to slowly varying deformations caused by temperature gradients and wind loading which causes each sensor bore sight to rotate away from its registered value. To correct for these errors it is possible to mount compass and inclinometer boards on each sensor, but in large installations there would be many such boards to calibrate and maintain. A need therefore exists for improved methods and systems for determining and removing the effects of the bias in the sensors.

SUMMARY

One embodiment is a method for determining rotation bias in a sensor using a cooperative target. The method includes receiving, via a processor, sensor data acquired in a field of view of a sensor at a plurality of points in time. The method also includes receiving, via the processor, position data for a cooperative target travelling along a path through the field of view of the sensor at the plurality of points in time. The method also includes determining, via the processor, a rotation bias in the sensor based on a maximum likelihood estimate performed over the path based on the sensor data and the cooperative target position data.

In some embodiments, the method includes correcting a sensor measurement command based on the determined rotation bias. In some embodiments, the sensor measurement command is a slewing command of the sensor. In some embodiments, the method includes correcting measurements made using the sensor based on the rotation bias and providing the corrected sensor measurements to a multiple hypothesis tracker.

In some embodiments, the maximum likelihood estimate is calculated in accordance with the following:

$$\Lambda(\bar{b}) = \sum_{k=1}^{K} \min\left(\ln(V), \min_{1 \leq n_k \leq m_k} \left\{ \frac{1}{2}[\bar{z}_{k,n_k} - \bar{h}(\bar{x}_{k|k}, \bar{b})]^T S_k^{-1} [\bar{z}_{k,n_k} - \bar{h}(\bar{x}_{k|k}, \bar{b})] + \ln(2\pi\sqrt{|S_k|})\right\}\right)$$

wherein, $\bar{z}_{k,n_k}$ represents the set of $n_k$ sensor measurements at dwell k, $\bar{b}$ is the rotation bias, V is the field of view volume, $\bar{x}_{k|k}$ is the cooperative target coordinate position output by a Kalman filter, $\bar{h}_k$ is an expected measurement for the sensor measurement, and $S_k$ is a sensor measurement covariance matrix.

In some embodiments, the method includes acquiring the sensor data and the cooperative target position data if the cooperative target is located within the field of view of the sensor. In some embodiments, the method includes determining the rotation bias if the cooperative target is located within the field of view of the sensor. In some embodiments, the method includes generating the sensor data using a change detection process on measurements acquired using the sensor. In some embodiments, the cooperative target is a GPS equipped cooperative target.

Another embodiment is a system for determining rotation bias in a sensor using a cooperative target. The system includes a sensor module configured to receive sensor data acquired in a field of view of a sensor at a plurality of points in time. The system also includes a target position module configured to generate position data for a cooperative target travelling along a path through the field of view of the sensor at the plurality of points in time. The system also includes a rotation bias module configured to determine a rotation bias in the sensor based on a maximum likelihood estimate performed over the path based on the sensor data and the cooperative target position data.

In some embodiments, the sensor module is configured to acquire the sensor data and the target position module is configured to acquire the position data if the cooperative target is located within the field of view of the sensor. In some embodiments, the rotation bias module is configured to determine the rotation bias based on whether the cooperative target is located within the field of view of the sensor.

In some embodiments, the system includes a sensor command module that is configured to correct a sensor measurement command based on the determined rotation bias. In some embodiments, the sensor measurement command is a slewing command of the sensor. In some embodiments, the system includes a sensor measurement correction module configured to correct measurements made using the sensor based on the rotation bias and provide the corrected sensor measurements to a multiple hypothesis tracker.

In some embodiments, the cooperative target includes a receiver for measuring position of the cooperative target and a transmitter for transmitting the measured cooperative target position data to the rotation bias module. In some embodiments, the rotation bias module is configured to calculate the maximum likelihood estimate in accordance with:

$$\Lambda(\bar{b}) = \sum_{k=1}^{K} \min\left(\ln(V), \min_{1 \leq n_k \leq m_k} \left\{ \frac{1}{2}[\bar{z}_{k,n_k} - \bar{h}(\bar{x}_{k|k}, \bar{b})]^T S_k^{-1} [\bar{z}_{k,n_k} - \bar{h}(\bar{x}_{k|k}, \bar{b})] + \ln(2\pi\sqrt{|S_k|})\right\}\right)$$

wherein, $\bar{z}_{k,n_k}$ represents the set of $n_k$ sensor measurements at dwell k, $\bar{b}$ is the rotation bias, V is the field of view volume, $\bar{x}_{k|k}$ is the cooperative target coordinate position output by a Kalman filter, $\bar{h}_k$ is an expected measurement for the sensor measurement, and $S_k$ is a sensor measurement covariance matrix.

In some embodiments, the system includes a change detection module for generating the sensor data from measurements acquired using the sensor. In some embodiments, the cooperative target is a GPS equipped cooperative target.

Another embodiment is a system for determining rotation bias in a sensor using a cooperative target. The system includes at least one sensor and a sensor module configured to acquire sensor data in a field of view of the at least one sensor at a plurality of points in time. The system also includes a target position module configured to acquire position data for a cooperative mobile target travelling along a path through the field of view of the sensor at the plurality of points in time. The system also includes a rotation bias module configured to determine a rotation bias in the sensor based on a maximum likelihood estimate performed over the path based on the sensor data measurements and the cooperative target position data.

Another embodiment is a system for determining rotation bias in a sensor using a cooperative target. The system includes a rotation bias module configured to determine a rotation bias in a sensor, wherein the rotation bias is based on a maximum likelihood estimate performed using position data acquired at a plurality of points in time for a cooperative target travelling over a path through the sensor field of view and is also based on sensor data acquired in the sensor field of view at the plurality of points in time.

The rotation bias determination methods and systems described herein (hereinafter "technology") can provide one or more of the following advantages. One advantage of the technology is centralized processing of sensor measurements to determine rotation bias in sensors, enables easy, automated calibration of the sensors. Another advantage is the use of a GPS enabled cooperative target to determine the rotation bias in sensors, reduces the cost and complexity associated with determining the bias and with calibrating the sensors in the field.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings.

DETAILED DESCRIPTION OF ILLUSTRATIVE EMBODIMENTS

Fixed cameras, pan-tilt-zoom cameras, and surface detection radars are susceptible to ambient changes in the support structures use to support the sensors. Temperature changes cause the position and/or orientation of the structures to vary thereby causing measurement errors in the sensor signals. The measurement errors compromise a sensor's ability to, for example, properly determine a target location or track a target. Embodiments described herein determine rotation bias in sensors and compensate for the rotation bias to enable accurate measurements to be made.

Figure 1:
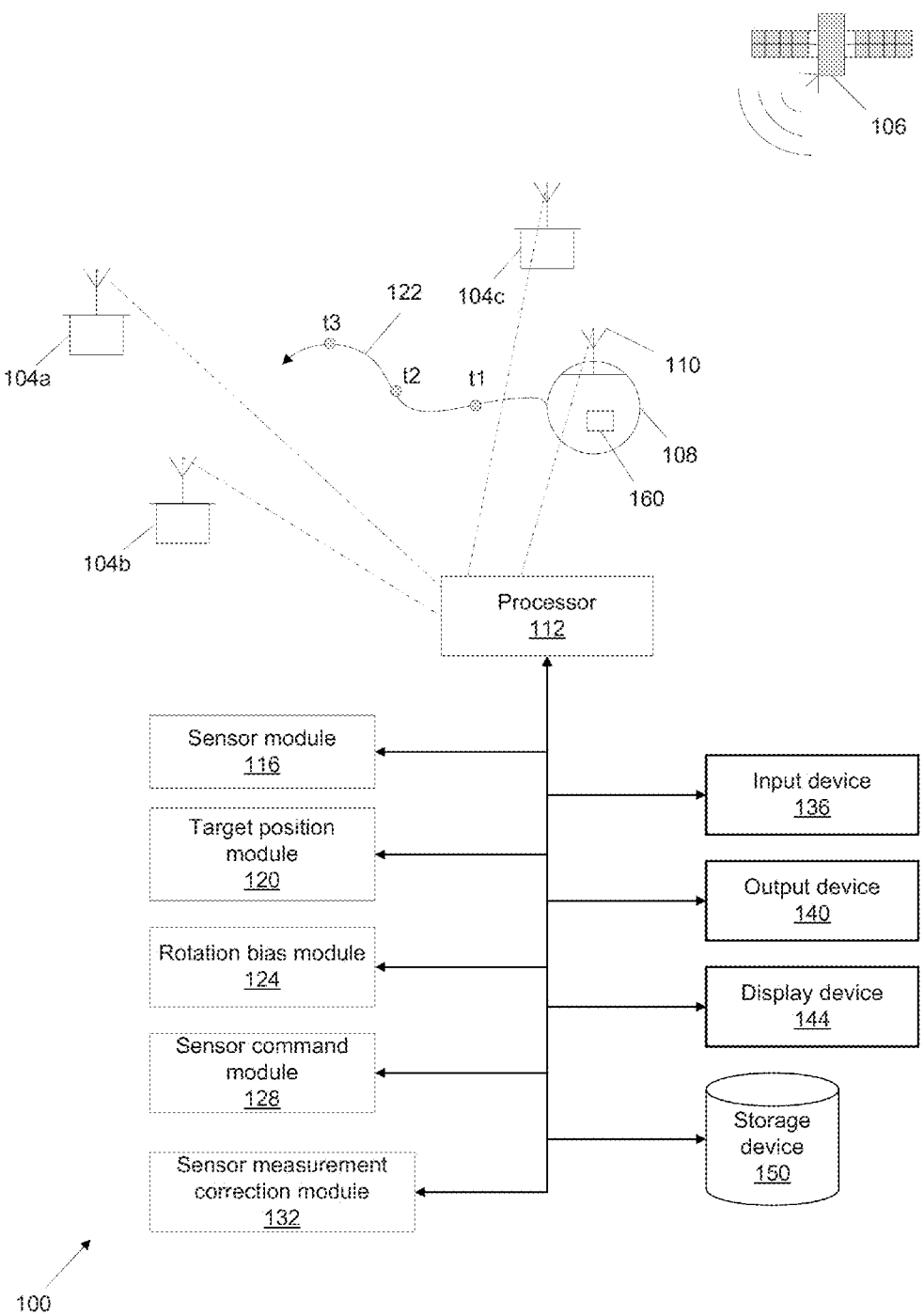
FIG. 1 is a schematic illustration of a system for determining rotation bias in a sensor using a cooperative target, according to an illustrative embodiment.

FIG. 1 is a schematic illustration of a system 100 for determining rotation bias in one or more sensors 104a, 104b and 104c (generally 104) using a cooperative target 108, according to an illustrative embodiment. The sensors 104 measure position and velocity (e.g., range, range rate, azimuth and elevation) of target-like objects in the field of view (FOV) of the sensors 104. Exemplary types of sensors 104 are video surveillance cameras (e.g., pan-tilt-zoom (PTZ) cameras and fixed cameras) and surface detection radars (e.g., X-band surface detection radars). The sensors 104 transmit the target measurements to a processor 112 of the system 100.

In this embodiment, the cooperative target 108 is a mobile system that is capable of travelling along a path 122 through the field of view of the sensors 104. The cooperative target 108 is equipped to provide position and velocity data for the cooperative target 108 as it travels along the path 122 at a plurality of points in time (e.g., t1, t2, t3). In this embodiment, the cooperative target 108 is equipped with a global positioning system (GPS) receiver 160 that measures position and velocity of the target 108 based on signals generated by a GPS satellite 106. The cooperative target 108 also includes a transmitter 110 to transmit the measurements data associated with the target 108 to the processor 112.

The system 100 also includes a plurality of modules and devices that process the measurement data to determine the rotation bias in the sensors 104. In this embodiment, the system 100 includes a plurality of modules coupled to the processor: a sensor module 116, a target position module 120, a rotation bias module 124, a sensor command module 128, and a sensor measurement correction module 132. The system 100 also includes a plurality of devices coupled to the processor: input device 136, output device 140, display device 144, and storage device 150.

The sensor module 116 is configured to receive sensor data acquired in the field of view of the sensors 104 at a plurality of times (i.e., t1, t2, t3). The sensor data for the cooperative target is determined based on the measurements made using the sensors 104. In some embodiments, the system 100 has only a single sensor 104. In some embodiments, the sensors 104 are each the same type of sensor. However, in some embodiments, the sensors 104 include a plurality of different sensor types.

The target position module 120 is configured to generate position data for the cooperative target travelling along path 122 through the field of view of the sensors 104 at the plurality of points in time. The target position module 120 generates the position data based on the measurements made using the receiver 160.

The rotation bias module 124 is configured to determine a rotation bias in the sensors 104 based on a maximum likelihood estimate performed over the path 122 based on the sensor data and the cooperative target position data.

The sensor command module 128 is configured to correct sensor measurement commands based on the determined rotation bias. For example, in systems that employ the sensors 104 to monitor the field of view surrounding the sensors, an operator or automatic control system sends commands to the sensors 104 to scan across a specific path in the field of view of the sensors. In the absence of being able to determine the rotation bias, the commands would cause the sensors 104 to be directed to scan across a different, incorrect path.

The sensor measurement correction module 132 is configured to correct measurements made using the sensors 104 based on the rotation bias and provide the corrected sensor measurements to, for example a multiple hypothesis tracking system. For example, in systems that employ the sensors 104 to track targets, the system 100 sends corrected sensor measurements to the tracking system. Accordingly, in systems that employ the concepts described herein, it is possible to compensate for the rotation bias such that sensor measurements sent to the tracker will result in proper tracking of the targets.

The modules and devices described herein can, for example, utilize the processor 112 to execute computer executable instructions and/or include a processor to execute computer executable instructions. It should be understood that the system 100 can include, for example, other modules, devices, and/or processors known in the art and/or varieties of the illustrated modules, devices, and/or processors.

The input device 136 receives information associated with the system 100 (e.g., instructions from a user, instructions from another computing device) from a user or moderator (not shown) and/or another computing system (not shown). The input device 136 can include, for example, a keyboard or a scanner. The output device 140 outputs information associated with the system 100 (e.g., information to a printer (not shown), information to an audio speaker (not shown)). The display device 144 displays information associated with the system 100 (e.g., status information, configuration information, rotation bias values, target location). The processor 112 executes the operating system and/or any other computer executable instructions for the system 100 (e.g., sends rotation bias compensated sensor signals to a multiple hypothesis tracking system). The storage device 150 stores the various information associated with the system 100 and its operation. The storage device 150 can store information and/or any other data associated with the system 100. The storage device 150 can include a plurality of storage devices. The storage device 150 can include, for example, long-term storage (e.g., a hard drive, a tape storage device, flash memory), short-term storage (e.g., a random access memory, a graphics memory), and/or any other type of computer readable storage.

Figure 3:
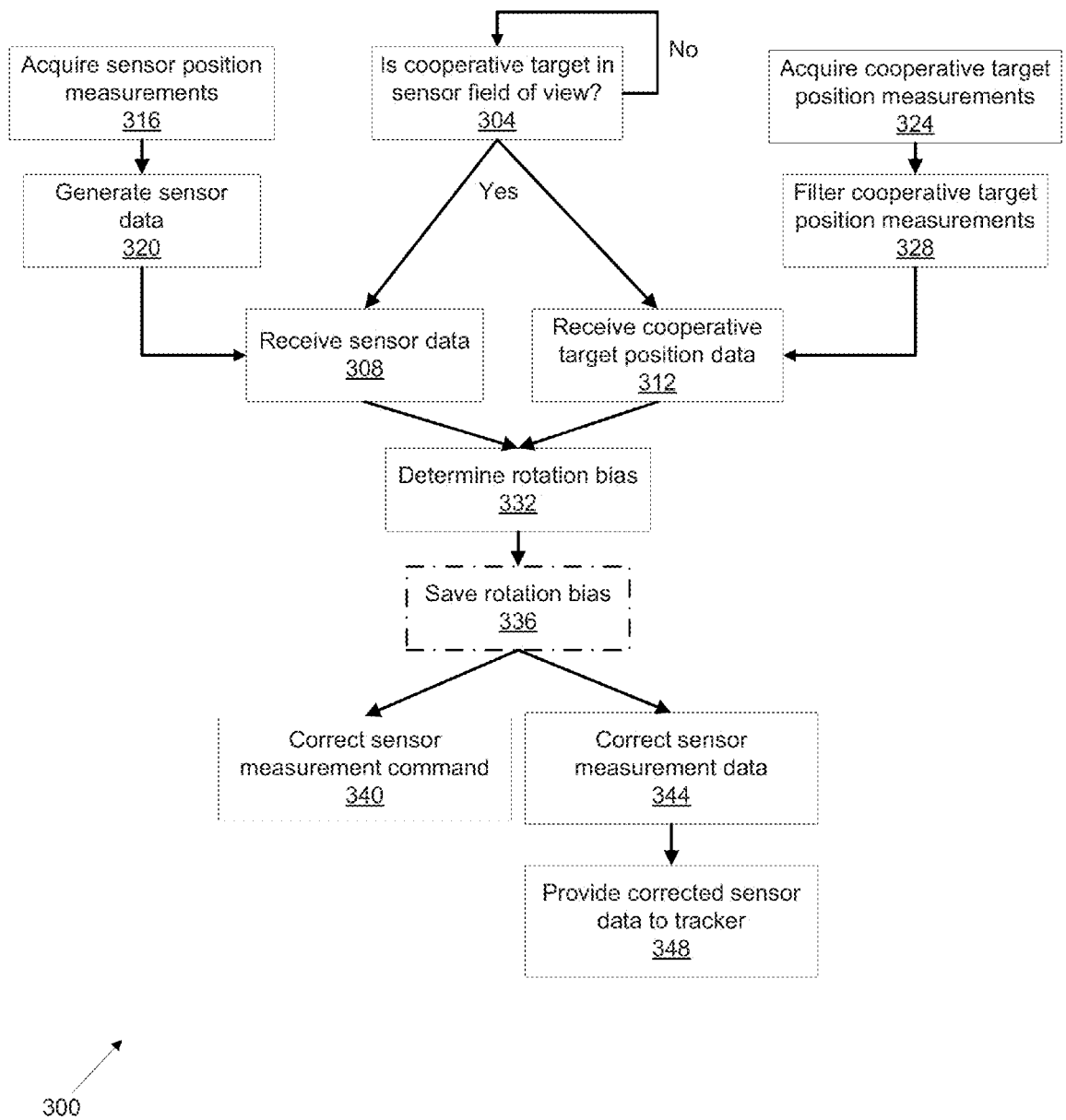
FIG. 3 is a flowchart of a method for determining rotation bias in a sensor using a cooperative target, according to an illustrative embodiment.

FIG. 3 is a flowchart 300 of a method for determining rotation bias in a sensor using a cooperative target, according to an illustrative embodiment. The method can be implemented using, for example, the system 100 of FIG. 1. The method includes determining 304 if the cooperative target is in the sensor's field of view. If the cooperative target is in the sensor's field of view, the method includes receiving sensor data 308 acquired in the field of view of the sensor at a plurality of points in time. The method also includes receiving position data 312 for the cooperative target travelling along a path through the field of view of the sensor at the plurality of points in time. The sensor data and the cooperative target position data may, for example, be received via the processor 112 of FIG. 1.

In some embodiments, the step of receiving sensor data 308 first involves acquiring sensor position measurements 316 for the cooperative target and then generating the sensor data 320 based on the sensor position measurements. This may involve, for example, generating the position by converting range, azimuth and elevation measurements to a position in an inertially-fixed X, Y, and Z coordinate system. In an embodiment that uses a camera as the sensor, video frames can be processed with a change detection algorithm to identify target-like objects for input to the tracker.

The technology described herein may be applied to any general sensor (e.g., a sensor capable of measuring range, azimuth, and elevation. In one embodiment, we consider a surface detection radar that measures only range and azimuth. Assuming the inertial cooperative target position is given by $\bar{R}_t = X_t \bar{I} + Y_t \bar{J} + Z_t \bar{K}$ and the inertial sensor position is given by $\bar{R}_r = X_r \bar{I} + Y_r \bar{J} + Z_r \bar{K}$ and that when registered the sensor reference frame axes are parallel with the inertial frame axes.

Figure 2:
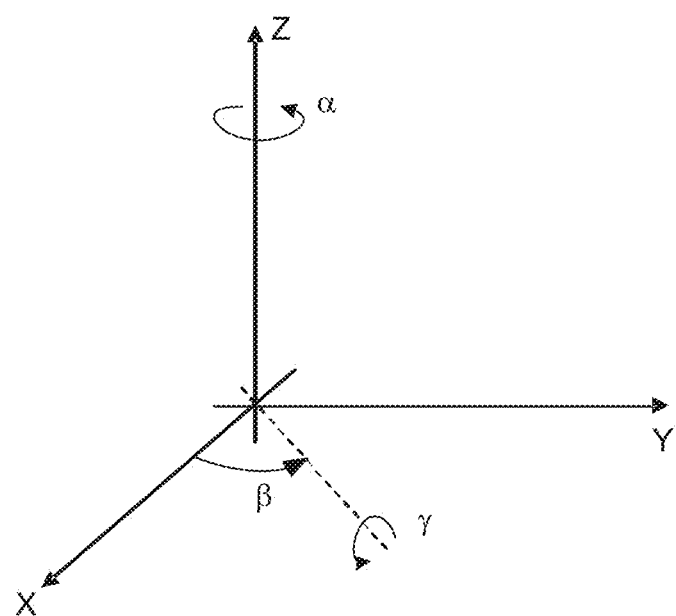
FIG. 2 is a schematic illustration of rotations of the sensor frame relative to the inertial reference frame, in an exemplary embodiment.

We then consider a general rotation of the sensor reference frame relative to the inertial frame as shown in FIG. 2. A vector $\bar{X}$ in the inertial frame will be rotated into a vector $\bar{x}$ in the sensor frame in accordance with:

$$\bar{x}[R(\alpha, \beta, \gamma)] = [R_2(\beta, \gamma)][R_1(\alpha)]\bar{X} \quad \text{EQN. 1}$$

where $$[R_1(\alpha)] = \begin{bmatrix} \cos(\alpha) & -\sin(\alpha) & 0 \\ \sin(\alpha) & \cos(\alpha) & 0 \\ 0 & 0 & 1 \end{bmatrix} \quad \text{EQN. 2}$$

and $$[R_2(\beta, \gamma)] = \begin{bmatrix} \cos(\gamma) + \cos^2(\beta)(1-\cos(\gamma)) & \sin(\beta)\cos(\beta)(1-\cos(\gamma)) & \sin(\beta)\sin(\gamma) \\ \sin(\beta)\cos(\beta)(1-\cos(\gamma)) & \cos(\gamma) + \sin^2(\beta)(1-\cos(\gamma)) & -\cos(\beta)\sin(\gamma) \\ -\sin(\beta)\sin(\gamma) & \cos(\beta)\sin(\gamma) & \cos(\gamma) \end{bmatrix}^T \quad \text{EQN. 3}$$

This form of the rotation was chosen in this embodiment for clarity, however, any three parameter/three degree rotation (e.g., space fixed) is applicable. The sensor frame is rotated by $\alpha$ around the Z axis, and then by $\gamma$ about an axis in the X-Y plane at an angle $\beta$ from the X axis.

The sensor measurement equation can be written as:

$$\bar{g}_k(\bar{x}_k) = \begin{bmatrix} g_x(\bar{x}_k) \\ g_y(\bar{x}_k) \\ g_z(\bar{x}_k) \end{bmatrix} = [R_2(\beta, \gamma)][R_1(\alpha)]\begin{bmatrix} X_{t,k} - X_r \\ Y_{t,k} - Y_r \\ Z_{t,k} - Z_r \end{bmatrix} \quad \text{EQN. 4}$$

$$\bar{h}_k(\bar{g}_k(\bar{x}_k)) = \begin{bmatrix} r_k \\ \theta_k \\ \phi_k \end{bmatrix} = \begin{bmatrix} \sqrt{g_x^2 + g_y^2 + g_z^2} \\ \tan^{-1}\left(\frac{g_y}{g_x}\right) \\ \tan^{-1}\left(\frac{g_z}{\sqrt{g_x^2 + g_y^2}}\right) \end{bmatrix} \quad \text{EQN. 5}$$

where $$\bar{x}_k = [X_{t,k} \quad Y_{t,k} \quad Z_{t,k} \quad \dot{X}_{t,k} \quad \dot{Y}_{t,k} \quad \dot{Z}_{t,k} \quad \ddot{X}_{t,k} \quad \ddot{Y}_{t,k} \quad \ddot{Z}_{t,k}]^T \quad \text{EQN. 6}$$

is the state vector used for tracking the cooperative target position and velocity where the subscript k is the discrete time index and the subscript t indicates the target state in the inertial reference frame.

The step of receiving position data 312 for the cooperative target can involve first acquiring cooperative target position measurements 324 and then filtering (using, for example, a Kalman filter method) the position measurements 328 to generate the cooperative target position data. In one embodiment, the cooperative target position data is filtered in accordance with the following Kalman filter formulation:

$$\bar{x}_k = F\bar{x}_{k-1} + \bar{u}_k \quad \text{EQN. 7}$$

where $$\bar{x}_k = [X_{t,k} \quad Y_{t,k} \quad Z_{t,k} \quad \dot{X}_{t,k} \quad \dot{Y}_{t,k} \quad \dot{Z}_{t,k} \quad \ddot{X}_{t,k} \quad \ddot{Y}_{t,k} \quad \ddot{Z}_{t,k}]^T \quad \text{EQN. 8}$$

and

-continued $$F = \begin{bmatrix} I_3 & TI_3 & \frac{-1+aT+e^{-aT}}{a^2}I_3 \\ 0_3 & I_3 & \frac{1-e^{-aT}}{a}I_3 \\ 0_3 & 0_3 & e^{-aT}I_3 \end{bmatrix} \quad \text{EQN. 9}$$

where F is the filter, $I_3$ is a 3×3 identity matrix, $0_3$ is a 3×3 zero matrix, a is the maneuver noise bandwidth, and T is the update interval. The process noise matrix, also referred to as maneuver noise excitation matrix, is given by Singer (in Robert A. Singer, "Estimating Optimal Tracking Filter Performance for Manned Maneuvering Targets", *IEEE Transactions on Aerospace and Electronic Systems*, Vol. 6 No. 4, 1970, pp. 473-483) which is hereby incorporated by reference in its entirety:

$$Q = 2a\sigma_m^2 \begin{bmatrix} q_{11}I_3 & q_{12}I_3 & q_{13}I_3 \\ q_{12}I_3 & q_{22}I_3 & q_{23}I_3 \\ q_{13}I_3 & q_{23}I_3 & q_{33}I_3 \end{bmatrix}. \quad \text{EQN. 10}$$

where $\sigma_m^2$ is the maneuver noise variance and the remaining parameters $q_{ij}$ are defined by Singer (in Robert A. Singer, "Estimating Optimal Tracking Filter Performance for Manned Maneuvering Targets", *IEEE Transactions on Aerospace and Electronic Systems*, Vol. 6 No. 4, 1970, pp. 473-483).

The measurement equation is given by:

$$z_k = H\bar{x}_k + \bar{v}_k \quad \text{EQN. 11}$$

where $$H = \begin{bmatrix} I_3 & 0_3 & 0_3 \\ 0_3 & I_3 & 0_3 \end{bmatrix}$$

Next, we consider the set of validated measurements that must be processed on any sensor dwell. This set may contain clutter and might not contain the target. We assume that the validation region is a subset of the sensor field of view that is large enough to allow for the range of expected rotation biases and guarantees that the sensor measurements on the dwells to be processed will include a return from the cooperative target if it is detected. We next let:

$$\bar{Z}^K = \{\bar{Z}_{1,m}, \ldots, \bar{Z}_{K,m_K}\} \quad \text{EQN. 12}$$

represent the measurement record where $$\bar{Z}_{k,n_k} = \{\bar{z}_{k,1}, \ldots, \bar{z}_{k,n_k}\} \quad \text{EQN. 13}$$

represents the set of $m_k$ measurements at dwell k, each with covariance R. Let $\xi_{k,n_k}$ represent the event that the $n_k^{th}$ measurement ($1 \leq n_k \leq m_k$) was from the cooperative target on the $k^{th}$ dwell and where $n_k=0$ (i.e. $\xi_{k,0}$) is the event that no measurement originated from the cooperative target, and let $$\Xi^K = \{\xi_{1,n}, \ldots, \xi_{K,n_K}\} \quad \text{EQN. 14}$$

represent the assignment of measurements to the cooperative target on each dwell. Let $$\hat{X}^K = \{\bar{x}_{1|1}, \ldots, \bar{x}_{K|K}\} \quad \text{EQN. 15}$$

represent the cooperative target position estimates from the Kalman filter based on cooperative target position and velocity measurements over the measurement record.

Let $$P^K\{P_{1/1}, \ldots, P_{K|K}\} \quad \text{EQN. 16}$$

represent the covariance of these position estimates. Let $\bar{b} = [\alpha\beta\gamma]^T$ represent the rotation bias vector. Then assuming Gaussian statistics and approximating the measurement mean value using the cooperative target position state, the conditional probability density function of the measurement record is given by $$\rho(Z^K|\Xi^K, \bar{b}, \hat{X}^K, P^K, R) = \prod_{k=1}^{K} A_k \quad \text{EQN. 17}$$

where $$A_k = \frac{V^{-m_k+1}}{2\pi\sqrt{|S_k|}} \exp\left(-\frac{1}{2}[z_{k,n_k} - \bar{h}(\bar{x}_{k|k}, \bar{b})]^T \right. \quad \text{EQN. 18}$$

$$\left. S(P_{k|k}, \bar{x}_{k|k}, \bar{b})^{-1}[z_{k,n_k} - \bar{h}(\bar{x}_{k|k}, \bar{b})]\right)$$

for $n_k \neq 0$ and $$A_k = V^{-m_k} \quad \text{EQN. 19}$$

for $n_k = 0$.

In EQNS. 17-19, V is the volume of the validation region, $S(P_{k|k}, \bar{x}_{k|k}, \bar{b}) = H_k P_{k|k} H_k^T + R$, $H_k^T$ is the measurement gradient matrix, which is linearized about the state estimate and bias, R is the measurement covariance, and the expected measurement $\bar{h}_k$ as a function of the state estimate and bias are obtained from EQNS. 4 and 5. Note that the sensor measurement rate and the cooperative target update rates are not necessarily aligned. Typically the sensor measurements arrive at a higher rate than the cooperative target measurements, and the state and covariance used above represent the values extrapolated to the measurement time when there is no coincident cooperative target measurement.

The maximum likelihood estimates of $\bar{b}$ and $\Xi^K$ are those values that maximize EQN. 17. Let $$\Lambda(\Xi^K, \bar{b}) = -\ln(\rho(Z^K|\Xi^K, \bar{b}, \hat{X}^K, P^K, R)) \quad \text{EQN. 20.}$$

Then from EQNS. 17-19 it follows that the maximum likelihood (ML) estimate of $\bar{b}$ will minimize $$\Lambda(\bar{b}) = \quad \text{EQN. 21}$$

$$\sum_{k=1}^{K} \min\left(\ln(V), \min_{1 \leq n_k \leq m_k} \left\{\frac{1}{2}[z_{k,n_k} - \bar{h}(\bar{x}_{k|k}, \bar{b})]^T S_k^{-1}[z_{k,n_k} - \bar{h}(\bar{x}_{k|k}, \bar{b})] + \ln(2\pi\sqrt{|S_k|})\right\}\right).$$

Note that in EQN. 21 the values of $n_k$ selected in the minimization determine $\Xi^K$ where $n_k=0$ if $\ln(V)$ is selected. The minimization will be dependent on $\bar{b}$, and consequently the objective function can switch the selection for $n_k$ as $\bar{b}$ changes, and it will, in general, be discontinuous. This equation can be optimized using a hybrid gradient descent (GD) and particle swarm optimizer (PSO), which requires a gradient calculation. Following EQNS. 4 and 5, in EQN. 21:

$$\bar{h}(\bar{x}_{k|k}, \bar{b}) = \begin{bmatrix} r_k \\ \theta_k \\ \phi_k \end{bmatrix} = \begin{bmatrix} \sqrt{g_x^2 + g_y^2 + g_z^2} \\ \tan^{-1}\left(\frac{g_y}{g_x}\right) \\ \tan^{-1}\left(\frac{g_z}{\sqrt{g_x^2 + g_y^2}}\right) \end{bmatrix} \quad \text{EQN. 22}$$

where $$\bar{g}(\bar{x}_{k|k}, \bar{b}) = \begin{bmatrix} g_x \\ g_y \\ g_z \end{bmatrix} = [R^2(\beta, \gamma)][R_1(\alpha)] \begin{bmatrix} x_{k|k} - x_r \\ y_{k|k} - y_r \\ z_{k|k} - z_r \end{bmatrix} \quad \text{EQN. 23}$$

and $$\bar{b} = \begin{bmatrix} \alpha \\ \beta \\ \gamma \end{bmatrix}$$

is the rotation bias, $$\begin{bmatrix} x_r \\ y_r \\ z_r \end{bmatrix}$$

is the sensor position, and $$\bar{x}_{k|k} = \begin{bmatrix} x_{k|k} \\ y_{k|k} \\ z_{k|k} \end{bmatrix}$$

is the position component of the cooperative target state. Also, from the chain rule, $$H_k = (\nabla_{\bar{x}_{k|k}} \bar{h}^T)^T|_{\bar{x}_{k|k},\bar{b}} = (\nabla_{\bar{g}} \bar{h}^T)^T|_{\bar{g}(\bar{x}_{k|k})} (\nabla_{\bar{x}_{k|k}} \bar{g}^T)^T|_{\bar{x}_{k|k},\bar{b}} \quad \text{EQN. 24}$$

from which $$H_k = \begin{bmatrix} \frac{g_x}{r} & \frac{g_y}{r} & \frac{g_z}{r} \\ \frac{-g_y}{R^2} & \frac{g_x}{R^2} & 0 \\ \frac{1}{R}\frac{-g_z g_x}{R^2 + g_z^2} & \frac{1}{R}\frac{-g_z g_y}{R^2 + g_z^2} & \frac{R}{R^2 + g_z^2} \end{bmatrix}_{\bar{g}(\bar{x}_{k|k})} \quad \text{EQN. 25}$$

$$[R_2(\beta, \gamma)][R_1(\alpha)]$$

where $r = \sqrt{g_x^2 + g_y^2 + g_z^2}$ and $R = \sqrt{g_x^2 + g_y^2}$. Note that in EQN. 21 both $\bar{h}$ and $H_k$ are functions of $\bar{b}$. From EQN. 21:

$$\frac{\partial \Lambda}{\partial \alpha} = \sum_{\substack{k=1 \\ n_k \neq 0}}^{K} \left[ \frac{-\partial \bar{h}(\bar{x}_{k|k}, \bar{b})}{\partial \alpha} \right]^T S_k^{-1} [z_{k,n_k} - \bar{h}(\bar{x}_{k|k}, \bar{b})] + \quad \text{EQN. 26}$$

$$\frac{1}{2}[z_{k,n_k} - \bar{h}(\bar{x}_{k|k}, \bar{b})]^T \frac{\partial S_k^{-1}}{\partial \alpha} [z_{k,n_k} - \bar{h}(\bar{x}_{k|k}, \bar{b})] + \frac{1}{2}\frac{\partial \ln(|S_k|)}{\partial \alpha}$$

where, from the chain rule, $$\frac{\partial \bar{h}(\bar{x}_{k|k}, \bar{b})}{\partial \alpha} = (\nabla_{\bar{g}} \bar{h}^T)^T|_{\bar{g}(\bar{x}_{k|k})} \left(\frac{\partial \bar{g}}{\partial \alpha}\right)\bigg|_{\bar{x}_{k|k},\bar{b}} \quad \text{EQN. 27}$$

and $$\left(\frac{\partial \bar{g}}{\partial \alpha}\right)\bigg|_{\bar{x}_{k|k},\bar{b}}$$

is readily obtained from EQN. 23 to obtain:

$$\frac{\partial \bar{h}(\bar{x}_{k|k}, \bar{b})}{\partial \alpha} = \begin{bmatrix} \frac{g_x}{r} & \frac{g_y}{r} & \frac{g_z}{r} \\ \frac{-g_y}{R^2} & \frac{g_x}{R^2} & 0 \\ \frac{1}{R}\frac{-g_z g_x}{R^2 + g_z^2} & \frac{1}{R}\frac{-g_z g_y}{R^2 + g_z^2} & \frac{R}{R^2 + g_z^2} \end{bmatrix}_{\bar{g}(\bar{x}_{k|k})} \quad \text{EQN. 28}$$

$$[R_2(\beta, \gamma)]\left[\frac{\partial R_1(\alpha)}{\partial \alpha}\right] \begin{bmatrix} x_{k|k} - x_r \\ y_{k|k} - y_r \\ z_{k|k} - z_r \end{bmatrix}$$

where $$\frac{\partial S_k^{-1}}{\partial \alpha} = -S_k^{-1}\left(\frac{\partial S_k}{\partial \alpha}\right) S_k^{-1}$$

and $$\left(\frac{\partial S_k}{\partial \alpha}\right)$$

is readily obtained from $S_k = H_k P_{k|k} H_k^T + R$ and EQN. 25, and where $$\frac{\partial \ln(|S_k|)}{\partial \alpha} = Tr\left(S_k^{-1}\frac{\partial S_k}{\partial \alpha}\right).$$

Similar expressions are easily obtained for β and γ. Other parameterizations of the rotation matrix are readily accommodated.

In this embodiment, the method then involves determining the rotation bias 332 in the sensor based on a maximum likelihood estimated performed over the path based on the sensor data and the cooperative target position data. In one embodiment, the method includes calculating the maximum likelihood estimate in accordance with:

$$\Lambda(\bar{b}) = \sum_{k=1}^{K} \min\left(\ln(V), \min_{1 \leq n_k \leq m_k}\left\{\frac{1}{2}[z_{k,n_k} - \bar{h}(\bar{x}_{k|k}, \bar{b})]^T \right.\right. \quad \text{EQN. 29}$$

$$\left.\left. S_k^{-1}[z_{k,n_k} - \bar{h}(\bar{x}_{k|k}, \bar{b})] + \ln(2\pi\sqrt{|S_k|})\right\}\right)$$

where, $z_{k,n_k}$ represents the set of $n_k$ sensor measurements at dwell k, $\bar{b}$ is the rotation bias, V is the field of view volume, $\bar{x}_{k|k}$ is the cooperative target coordinate position output by a Kalman filter, $\bar{h}_k$ is an expected measurement for the sensor measurement, and $S_k$ is a sensor measurement covariance matrix.

In this embodiment, the method then includes the optional step of saving the rotation bias 336 for, for example, subsequent retrieval. In this embodiment, the method includes using the rotation bias for correcting sensor measurement commands (e.g., slewing commands of the sensor) based on the determined rotations bias 340 and/or correcting measurements made using the sensor 344 based on the rotation bias. After correcting the measurements (step 344), the method also includes providing the corrected sensor measurements to a multiple hypothesis tracker 348.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for determining rotation bias in a sensor using a cooperative target, the method comprising:
   receiving, via a processor, sensor data acquired in a field of view of a sensor at a plurality of points in time;
   receiving, via the processor, position data for a cooperative target travelling along a path through the field of view of the sensor at the plurality of points in time;
   determining, via the processor, a rotation bias in the sensor based on a maximum likelihood estimate performed over the path based on the sensor data and the cooperative target position data; and
   commanding the sensor to scan across a specific path in the field of view of the sensor based on the determined rotation bias.

2. The method of claim 1, comprising correcting a sensor measurement command based on the determined rotation bias.

3. The method of claim 2, wherein the sensor measurement command is a slewing command of the sensor.

4. The method of claim 1, comprising correcting measurements made using the sensor based on the rotation bias and providing the corrected sensor measurements to a multiple hypothesis tracker.

5. The method of claim 1, wherein the maximum likelihood estimate is calculated in accordance with:

$$\Lambda(\bar{b}) = \sum_{k=1}^{K} \min\left(\ln(V), \min_{1 \leq n_k \leq m_k} \left\{\frac{1}{2}[\bar{z}_{k,n_k} - \bar{h}(\bar{x}_{k|k}, \bar{b})]^T S_k^{-1} [\bar{z}_{k,n_k} - \bar{h}(\bar{x}_{k|k}, \bar{b})] + \ln(2\pi\sqrt{|S_k|})\right\}\right)$$

wherein,
$\bar{z}_{k,n_k}$ represents the set of $n_k$ sensor measurements at dwell k,
$\bar{b}$ is the rotation bias,
V is the field of view volume,
$\bar{x}_{k|k}$ is the cooperative target coordinate position output by a Kalman filter,
$\bar{h}_k$ is an expected measurement for the sensor measurement, and
$S_k$ is a sensor measurement covariance matrix.

6. The method of claim 1, comprising acquiring the sensor data and the cooperative target position data if the cooperative target is located within the field of view of the sensor.

7. The method of claim 1, comprising determining the rotation bias if the cooperative target is located within the field of view of the sensor.

8. The method of claim 1, comprising generating the sensor data using a change detection process on measurements acquired using the sensor.

9. The method of claim 1, wherein the cooperative target is a GPS equipped cooperative target.

10. A system for determining rotation bias in a sensor using a cooperative target, the system comprising:
    a sensor processor configured to receive sensor data acquired in a field of view of a sensor at a plurality of points in time;
    a target position processor configured to generate position data for a cooperative target travelling along a path through the field of view of the sensor at the plurality of points in time;
    a rotation bias processor configured to determine a rotation bias in the sensor based on a maximum likelihood estimate performed over the path based on the sensor data and the cooperative target position data; and
    an automatic controller configured to command the sensor to scan across a specific path in the field of view of the sensor based on the determined rotation bias.

11. The system of claim 10, wherein the sensor processor is configured to acquire the sensor data and the target position processor is configured to acquire the position data if the cooperative target is located within the field of view of the sensor.

12. The system of claim 10, wherein the rotation bias processor is configured to determine the rotation bias based on whether the cooperative target is located within the field of view of the sensor.

13. The system of claim 10, comprising a sensor command processor that is configured to correct a sensor measurement command based on the determined rotation bias.

14. The system of claim 13, wherein the sensor measurement command is a slewing command of the sensor.

15. The system of claim 10, comprising a sensor measurement correction processor configured to correct measurements made using the sensor based on the rotation bias and provide the corrected sensor measurements to a multiple hypothesis tracker.

16. The system of claim 10, wherein the cooperative target includes a receiver for measuring position of the cooperative target and a transmitter for transmitting the measured cooperative target position data to the rotation bias processor.

17. The system of claim 10, wherein the rotation bias processor is configured to calculate the maximum likelihood estimate in accordance with:

$$\Lambda(\bar{b}) = \sum_{k=1}^{K} \min\left(\ln(V), \min_{1 \leq n_k \leq m_k} \left\{\frac{1}{2}[\bar{z}_{k,n_k} - \bar{h}(\bar{x}_{k|k}, \bar{b})]^T S_k^{-1} [\bar{z}_{k,n_k} - \bar{h}(\bar{x}_{k|k}, \bar{b})] + \ln(2\pi\sqrt{|S_k|})\right\}\right)$$

wherein,
$\bar{z}_{k,n_k}$ represents the set of $n_k$ sensor measurements at dwell k, $\overline{b}$ is the rotation bias, V is the field of view volume, $\overline{x}_{k|k}$ is the cooperative target coordinate position output by a Kalman filter, $\overline{h}_k$ is an expected measurement for the sensor measurement, and $S_k$ is a sensor measurement covariance matrix.

18. The system of claim 10, comprising a change detection processor for generating the sensor data from measurements acquired using the sensor.

19. The system of claim 10, wherein the cooperative target is a GPS equipped cooperative target.

20. A system for determining rotation bias in a sensor using a cooperative target, the system comprising:

at least one sensor;

a sensor processor configured to acquire sensor data in a field of view of the at least one sensor at a plurality of points in time;

a target position processor configured to acquire position data for a cooperative mobile target travelling along a path through the field of view of the sensor at the plurality of points in time;

a rotation bias processor configured to determine a rotation bias in the sensor based on a maximum likelihood estimate performed over the path based on the sensor data measurements and the cooperative target position data; and an automatic controller configured to command the sensor to scan across a specific path in the field of view of the sensor based on the determined rotation bias.

21. A system for determining rotation bias in a sensor using a cooperative target, the system comprising:

a rotation bias processor configured to determine a rotation bias in a sensor, wherein the rotation bias is based on a maximum likelihood estimate performed using position data acquired at a plurality of points in time for a cooperative target travelling over a path through the sensor field of view and is also based on sensor data acquired in the sensor field of view at the plurality of points in time; and an automatic controller configured to command the sensor to scan across a specific path in the field of view of the sensor based on the determined rotation bias.

* * * * *